United States Patent [19]

Moniak et al.

[11] 3,725,585

[45] Apr. 3, 1973

[54] LOUDSPEAKING TELEPHONE STATION CIRCUIT

[75] Inventors: John Moniak; Edwin R. Bridenbaugh, both of Corinth, Miss.

[73] Assignee: International Telephone and Telegraph Corporation, New York, N.Y.

[22] Filed: Mar. 21, 1972

[21] Appl. No.: 236,714

[52] U.S. Cl. ..............................179/1 HF, 179/81 B

[51] Int. Cl. ..............................H04m 9/08

[58] Field of Search ........179/1 HF, 1 VC, 1 H, 81 B, 179/100 L; 325/304

[56] References Cited

UNITED STATES PATENTS 3,461,240 8/1969 Lindgren..........................179/81 B 3,562,791 2/1971 Baker..............................179/1 HF

*Primary Examiner*—Kathleen H. Claffy

*Assistant Examiner*—Douglas W. Olms

*Attorney*—C. Cornell Remsen, Jr. et al.

[57] ABSTRACT

Disclosed is a circuit for providing voice controlled switching for a loudspeaking telephone station. The circuit is generally bistable and in one approach, it is possible for a small amount of bias to be inserted in the circuit to restore it to its transmit mode in the absence of external signals. In operation, a comparator continuously compares the transmit signals against received signal to determine in which mode the circuit should operate, i.e., continue in the operating mode or switch to the other mode. Once in a mode, either transmit or receive, an artificial signal gain is added to the main signal fed to the comparator to prevent oscillatory switching. The actual signal plus the artificial signal must be outweighed by the signal on the other path to effect a switchover.

11 Claims, 3 Drawing Figures

LOUDSPEAKING TELEPHONE STATION CIRCUIT

BACKGROUND OF THE INVENTION

Loudspeaking telephone sets generally include a transmitting path including a microphone, and a receiving path including a loudspeaker. Such sets are, and will continue to be, widely used. Loudspeaking telephone sets, unfortunately, present certain inherent problems, the most significant probably being that of acoustic coupling or feedback. The later effect occurs when sound energy produced by the set loudspeaker is transmitted directly to the set microphone and back to the remote talker as echo.

Various techniques such as the use of voice-switching arrangements using variolossers in the transmit and receive path have been employed in an attempt to minimize acoustic coupling so that only on of the channels is effectively operative at a time. The variolossers function to inversely vary the insertion loss in the respective paths. A particular problem, but by no means the only one associated with voice-switching arrangements occurs when the switched loss network in the path of one of the parties precludes him from readily breaking in on the speech of the other. The objectionable echoes may be completely suppressed using this technique, but at the sacrifice of a two-way circuit connection.

SUMMARY OF THE INVENTION

The present invention provides a loudspeaking telephone circuit in which the amplitude level of signals to be received are compared against signals to be transmitted to switch the circuit in favor of the signal of greater amplitude. Once the circuit is in one mode of operation, signals are, of course, amplified and a combined signal derived from both incoming signals and the amplified signal are fed to the comparator. Thus, to overcome this dual signal, a signal sufficient to cause change of mode switching must be greater than the combined signal. This added signal which must be overcome provides a dead band or hysteresis area to prevent the circuit from rapidly oscillating between modes.

It is, therefore, a major object of the invention to provide a new and improved voice-switched, loudspeaking telephone.

It is a further object of the invention to provide a new loudspeaking telephone circuit which prevents oscillations between modes of operation.

It is still a further object of the invention to provide a voice-switched loudspeaking telephone which is capable of using for its major components integrated circuit devices.

DETAILED DESCRIPTION OF THE DRAWINGS

Figure 1:
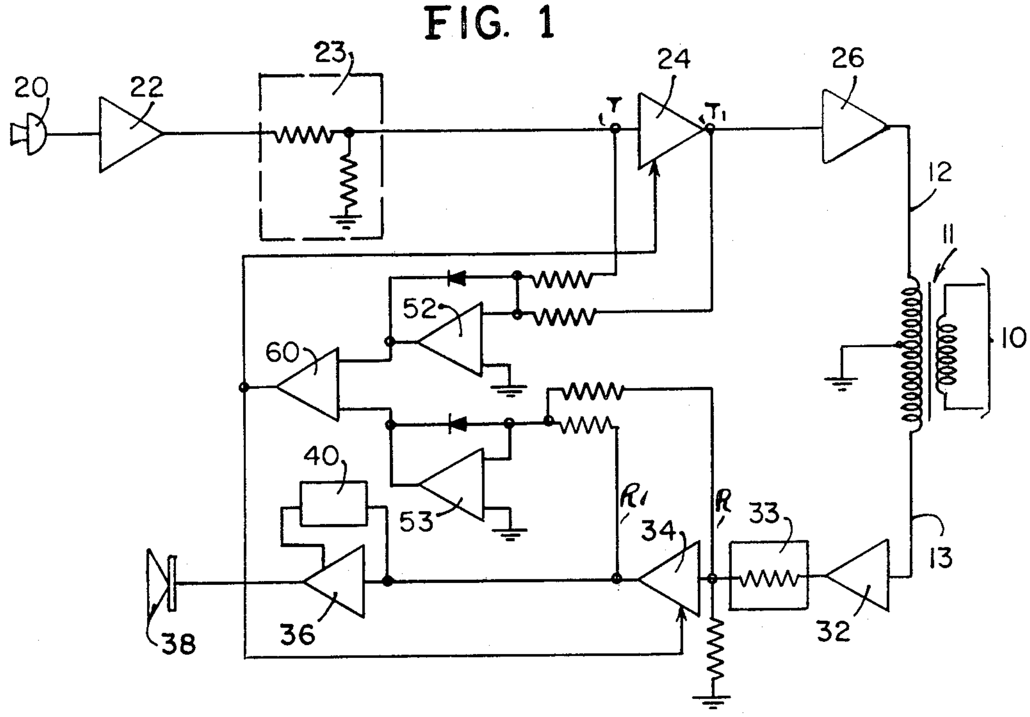
FIG. 1 is a simplified block diagram of a circuit employing our invention.

In the block diagram of FIG. 1, we show line leads 10 leading to the equipment in a central office (not shown) in any conventional manner. The line leads 10 terminate at the primary of a standard hybrid transformer 11. Across the secondary 14 of transformer 11 are a first conductor 12 leading to the output of the transmit path and a second conductor 13 leading to the input of the receive path. The transformer secondary center tap is grounded conventionally.

The transmit path comprises a microphone 20, leading to a serial path including a preamplifier 22, a pad attenuator 23, a switching amplifier 24 and a driving amplifier 26, the output of driving amplifier being connected to conductor 12.

The receive path serially leading from conductor 13 includes a preamplifier 32, a pad attenuator 33, a switching amplifier 34 and a power amplifier 36 and a speaker 38. A suitable gain control circuit 40 is connected across power amplifier 36.

Signals from the respective paths are channeled to respective converting amplifiers 52 for the transmit channel and 53 for the receive channel. Within the amplifiers and the accompanying diode networks, the signals are converted to d.c. signals. The output of amplifiers 52 and 53 are fed to a comparator 60, which compares the instantaneous peak amplitudes of signals received from the respective paths. In response to a greater peak amplitude signal, the comparator 60 switches the switching amplifiers 24 and 34 such that the amplifier of the path exhibiting the greater peak amplitude is in its "on" state and the other in its "Off" state. The switching is effected over respective leads 62 for transmit and 63 for receive.

In general, the operational amplifiers shown in the block diagram are of two types with amplifiers 22, 26, 32, 52, 53 and 60 being of a first type. These amplifiers are general purpose integrated circuit, and in the form shown are dual operational amplifiers. The two amplifying units making up an amplifier are shown as a single amplifier, both units of which share a common bias network and power supply leads but are otherwise independent in operation. Operational amplifiers suitable for the circuit may be off-the-shelf devices. An example of a suitable amplifier could be effected by the use of two LM709 or LM741 operational amplifiers, one for each of the dual amplification units.

Switching amplifiers 24 and 34 are of a second type, both being general purpose integrated circuit, gate controlled wideband amplifiers. These amplifiers may be fabricated using monolithic silicon, expitaxial passivated techniques. These amplifiers are also off-the-shelf readily available items. An example of one suitable amplifier which may be used for both switching amplifiers 24 and 34 is generally sold and known as Operational Amplifier LM370. Power amplifier 36 is also an off-the-shelf integrated circuit which is classed as a standard monolithic amplifier with complimentary emitter follower for increased power applications.

Within the circuit, preamplifier 22 may be set to produce a 40 db gain. Switching amplifiers 24 and 34 are connected to switch, as mentioned previously in a mutually exclusive manner, between a 20 db gain and a −70 db attenuation. Thus, one of the switching amplifiers is always in its attenuating state, the other in its amplifying state.

In the transmit path, preamplifier 22 may be set to add 40 db of gain to a signal generated by the microphone, and driving amplifier 36 may be set to add 20 db gain. In the receive path, preamplifier 32 may be set to add 8 db of gain and power amplifier 36 may be gain controlled between 20 db of gain and 10 db of attenuation.

In this network, the system is normally bi-stable and remains in the last state to which is has been switched. The combination of signals from points T and T1 (amplified T Signal) of the transmit path are fed to the converting or rectifying amplifier 52. As long as the combined signal is greater than any receive signal transmitted from point R to amplifier 53, the comparator 60 retains the condition of switching amplifiers 52 and 53, as is. When the signal at R increases to a higher peak level than the combined signal derived from points T and T1, the comparator 60 causes the two amplifiers to switch and change their operative conditions such that amplifier 24 reaches its attenuating condition and amplifier 34 reaches its gain condition. In this condition, the combined signal R and R1 is compared against signal T.

Figure 2:
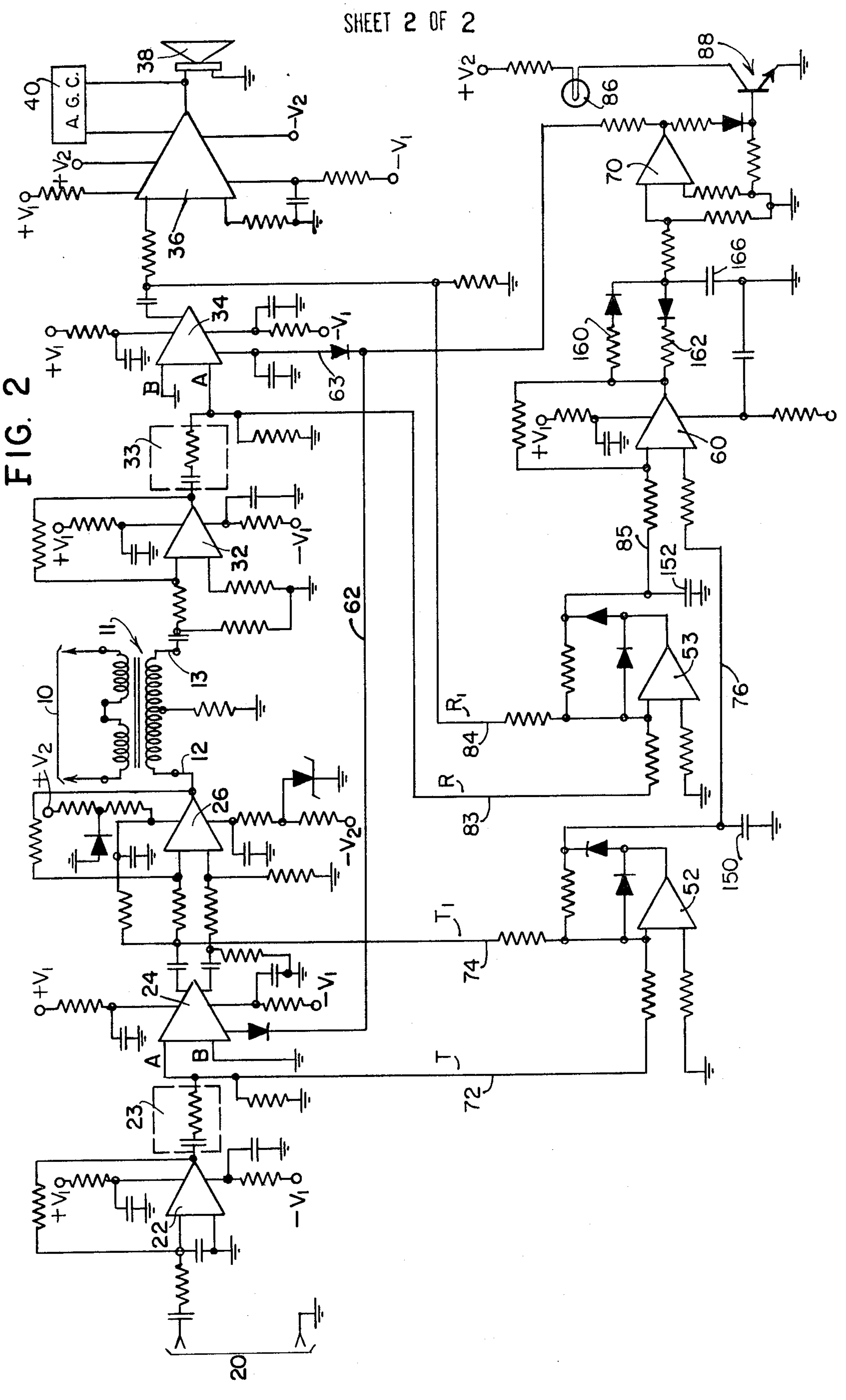
FIG. 2 is a more detailed schematic diagram of our circuit.

FIG. 2 is a somewhat more detailed showing than FIG. 1, showing in greater detail the biasing of the devices in the system.

The attenuation pads 23 and 33 are shown as series resistance capacitance combinations, each of which is designed to produce a 20 db attenuation in the signal passing through its respective preamplifier 22 and 32.

Further, the switching amplifiers 24 and 34 are shown joined as dual channel devices with an A and a B channel, the A channel being the gain channel and channel B the attenuating channel. In actuality, using LM370 amplifiers, two separate amplifiers are provided. When the comparator 60 sends an enabling signal through driving amplifier 70 to leads 62 and 63 and the respective transmit and receive paths and causes one switch to its gain mode and the other to its attenuation mode.

Once a path is switched, for example to the transmitting state, the signal T at the output of pad attenuator 23 is amplified in switching amplifier 24 to an amplified signal T1. The basic T signal also passes from the pad attenuator 23 over path 72 to converting amplifier 52. The T1 signal at the output of amplifier 24 in addition to its continuance in the transmit path is also sent on lead 74 to another input of amplifier 52. At the output of amplifier 52, a filtered d.c. signal is transmitted over lead 76 to comparator 60. Any signal R received from pad 33 is transmitted over lead 83 to converting amplifier 53. The output of this amplifier is rectified to a pulsating d.c., then filtered and transmitted over lead 84 to the comparator. Instantaneous peak d.c. amplitudes are compared so that when the amplitude of receive signal R is greater than the combined sum of the amplitudes of the transmit signals T and T1, the comparator switches state to switch the telephone set mode from transmit to receive by switching both amplifiers 24 and 34.

Further, as mentioned previously, FIG. 2 shows a driving amplifier 70 which receives the output of comparator 60 and smooths the comparator output to a full off or binary zero condition or a full on or binary one condition. Such driver amplifiers are well known in the art.

Additionally, FIG. 2 includes a signalling lamp 86 powered by a transistor 88, the base lead of the transistor being driven by the driver output. The base lead is enabled during one mode to light the lamp and is disabled during the other mode. The lamp is an optional feature which may be used to indicate which mode is in effect at any given time.

It should be noted that the power amplifiers 26 and 36 have two voltages applied across them, the $V_1$ level and the $V_2$ level. The $V_1$ level + and − 6 volts regulated d.c. is applied to the entire system, while the $V_2$ level is applied to amplifiers 26 and 36. This $V_2$ voltage may be any suitable voltage, in the range of 12 to 24 volts, as necessary, unregulated.

Figure 3:
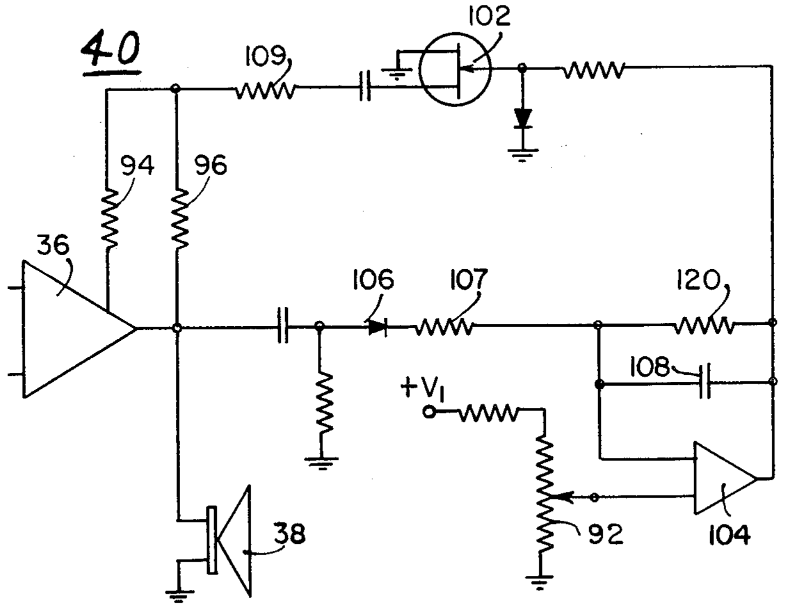
FIG. 3 is a schematic diagram of a gain control circuit.

The need for a gain control circuit of the type shown in FIG. 3 may be described as follows:

A received audio signal passes into the power amplifier 36 stage of the audio portion of the circuit. The power amplifier incorporates a standard operational amplifier driving a complementary emitter follower power stage, permitting extreme flexibility in usage and very low standby current drain. With a thirty ohm speaker load the standby current consumption is + and − 1.7 milliamps. The amplifier also permits the use of separate power supplies for the operational amplifiers and drivers. In the circuit the remaining amplifiers are powered by the normal regulated + and − $V_1$ and the drivers or power amplifiers 26 and 36 are powered by + and − unregulated d.c. at the higher $V_2$ level. This type of connection prevents the power supply voltage fluctuations due to the large signal current draw at the drivers from being reflected into more voltage-sensitive parts of the circuit.

The fluctuation, incidentally can be considerable because the output capability of the driving amplifier 36 with a thirty ohm speaker load is 0.45 watts peak. Without the A.G.C. circuit connected in the feedback loop the voltage gain of the power amplifier may be approximately 20 db. The A.G.C. circuit varies this loop gain to maintain a relatively constant speaker volume regardless of the magnitude of the receive signal, the volume being dependent on the setting of the volume control at potentiometer 92.

Some further advantages and points of interest should also be noted relative to the various ways the threshold level for conversation break-in may be set for each path independently of the other.

In the circuit of FIG. 2, the major keys to the setting of the operating threshold or break-in levels of each path over the other are the resistors 200 and 201 respectively. For example, reducing the resistance of resistor 200 greatly to enhance the ability to break in on a received conversation. To the same degree, changes in the size of resistor 201 vary greatly the threshold level for break-in on a signal or conversation being transmitted.

To a lesser degree, capacitors 150 and 152 affect the break-in values and may be changed as desired independently of one another to raise or lower the break-in thresholds of the respective paths. Resistors 160 and 162 in conjunction with capacitor 166 form a two-way delay circuit. Different values of resistance for these resistances provide different delays of the switching signal to the input of amplifier 70, each resistance being capable of delaying a differently directed signal, with such changes providing independent break-in capability for each direction of transmission.

We claim:

1. A loudspeaking telephone circuit for voice-controlled switching between a speaker path and a microphone path comprising a plurality of amplifiers in each path, means for comparing signals from each of said paths, and means responsive to a higher peak signal from one path for switching one of the amplifiers in said one path to a gain condition and switching a like amplifier in the other of said paths to an attenuating condition to attenuate any signals in said other path, and means in said one path for transmitting a signal amplified by said one amplifier in addition to the signal received from said one path to said comparing means for comparison with any signals from said other path.

2. A circuit as claimed in claim 1, wherein there is adjustable bias in said circuit to switch the one amplifier in said microphone path into its gain condition in the absence of signals from either path.

3. A circuit as claimed in claim 1, wherein there are means in said one path for retaining said one path in the last-mentioned switched state following termination of signals in both said paths.

4. A circuit as claimed in claim 1, in which there is electronic hysteresis means in the respective paths, the degree of hysteresis in each of said hysteresis means being independent one of the other.

5. A loudspeaking telephone comprising a transmit path including a microphone and a receive path including a speaker, each of said paths including a switching amplifier serially disposed in said path between said first and second amplifier, means for controlling the switching of the amplifiers in said paths in response to voice-controlled signals passed over said paths, said switch control means including means for converting signals received from each path to direct current signals, means for comparing said signals, and means responsive to a higher signal from one path for switching the switching amplifier in said one path to a gain condition and switching the switching amplifier in the other of said paths to an attenuating condition to attenuate any signals in said other path, and means connected directly from said one path for transmitting a signal amplified by said one switching amplifier in addition to the signal received from said one path to said comparing means to retain said one path in the gain condition.

6. A circuit as claimed in claim 5, wherein said amplifier, said converting means and said comparing means comprise operational amplifiers.

7. A loudspeaking telephone circuit for voice-controlled switching between a speaker path and a microphone path comprising a plurality of amplifiers in each path, and means for converting signals received from each path to direct current signals, means for comparing the peak amplitudes of said direct current signals, and means responsive to a higher peak signal in one path for switching one of the amplifiers in said one path to a gain condition and switching a like amplifier in the other of said paths to an attenuating condition to attenuate any signals in said other path, and a secondary path enabled with said one path in said gain condition for transmitting signals from said one path amplified by said one amplifier to said comparing means in addition to signals in said one path.

8. A circuit as claimed in claim 7, wherein there is a loudspeaker at the output of said speaker path for receiving amplified signals from said path, a power amplifier feeding said speaker, and a gain control circuit interposed between said power amplifier and said speaker.

9. A loudspeaking telephone circuit comprising first and second speech path, said speech paths including a transmit path having a microphone at one end thereof, and a receive path having a speaker at one end thereof;

each of said speech paths including a first and a second amplifier, and a switching amplifier serially positioned between said first and second amplifier;

a switch path connected to an input of each of said switching amplifiers for controlling the switching of said speech paths in response to voice-controlled signals at the first amplifier in each speech path, said switch path including means for converting signals received from each speech path to direct current signals, means for comparing said direct current signals, and means responsive to a higher peak signal from one speech path for switching the switching amplifier in said one speech path to a gain condition and switching the switching amplifier in the other of said speech paths to an attenuating condition to attenuate any signals in said other speech path, an auxiliary path connected from the outlet of said switching amplifiers for transmitting a signal amplified by the switching amplifier in a gain condition for addition to the signal received from the same speech path, said auxiliary paths being joined to the respective switch paths to add said amplified signal to the signal from said one path.

10. A circuit as claimed in claim 9, comprising means in each switch path for setting the break-in threshold of its speech path relative to the other speech path, said setting means being changeable independently of one another.

11. A circuit as claimed in claim 10, wherein there is a delay network, and said delay network comprises members representing each of said speech paths, said members independently effecting the break-in threshold of their respective speech paths.

* * * * *